US008260971B2

(12) United States Patent
Fa et al.

(10) Patent No.: US 8,260,971 B2
(45) Date of Patent: Sep. 4, 2012

(54) TECHNIQUES TO EXCHANGE INFORMATION FOR MULTIPLE MODEMS

(75) Inventors: Jinghuai Fa, Cupertino, CA (US); Jianxiong Shi, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 11/772,209

(22) Filed: Jun. 30, 2007

(65) Prior Publication Data
US 2009/0006703 A1 Jan. 1, 2009

(51) Int. Cl.
G06F 3/00 (2006.01)
(52) U.S. Cl. .......................................................... 710/2
(58) Field of Classification Search ........................ 710/2
See application file for complete search history.

(56) References Cited

U.S. PATENT DOCUMENTS

| 5,809,070 | A * | 9/1998 | Krishnan et al. ............. 375/222 |
| 6,285,889 | B1 | 9/2001 | Nykanen et al. |
| 6,553,240 | B1 | 4/2003 | Dervarics |
| 6,577,622 | B1 | 6/2003 | Schuster et al. |
| 6,600,421 | B2 | 7/2003 | Freeman |
| 6,745,047 | B1 | 6/2004 | Karstens et al. |
| 6,928,108 | B2 | 8/2005 | Nelson et al. |
| 7,131,575 | B1 * | 11/2006 | Kolls ............................ 235/379 |
| 7,319,715 | B1 * | 1/2008 | Souissi et al. ................. 375/220 |
| 2002/0114384 | A1 | 8/2002 | Nelson et al. |
| 2002/0167939 | A1 * | 11/2002 | Weissman-Berman et al. ............................. 370/352 |
| 2003/0035471 | A1 * | 2/2003 | Pitsoulakis .................... 375/222 |
| 2003/0217254 | A1 * | 11/2003 | Page et al. ......................... 713/2 |
| 2004/0010541 | A1 * | 1/2004 | Allen et al. .................... 709/203 |
| 2006/0083164 | A1 * | 4/2006 | Norton et al. ................. 370/229 |
| 2006/0176942 | A1 | 8/2006 | Oksman et al. |
| 2008/0244279 | A1 * | 10/2008 | Godzinski et al. ............ 713/300 |

FOREIGN PATENT DOCUMENTS

| GB | 2 342 535 A | 4/2000 |
| WO | WO 00/31650 A1 | 6/2000 |
| WO | WO 2004/008793 A1 | 1/2004 |

OTHER PUBLICATIONS

Universal Serial Bus—Wikipedia, the free encyclopedia, Jun. 21, 2007, http://web.archive.org/web/20070621044201/en.wikipedia.org/wiki/Universal_Serial_Bus.*
"Universal Serial Bus Specification", Revision 2.0, Apr. 27, 2000.*
RS-232—Wikipedia, the free encyclopedia, Mar. 25, 2006, http://web.archive.org/web/20060325172554/http://en.wikipedia.org/wiki/RS-232.*
European Search Report dated Sep. 22, 2011, issued in co-pending EP Application No. 08771918.3, Hewlett-Packard Development Company, L.P.

\* cited by examiner

*Primary Examiner* — Chun-Kuan Lee
*Assistant Examiner* — Farley Abad

(57) ABSTRACT

Techniques are disclosed involving the exchange of information with multiple modems. For instance, an apparatus includes a host device, a plurality of modems, and a serial connection to transfer information between the host device and the plurality of modems. The information may include data associated with one or more user applications and commands for the plurality of modems. The serial connection may be a Universal Serial Bus (USB) connection.

20 Claims, 4 Drawing Sheets

TECHNIQUES TO EXCHANGE INFORMATION FOR MULTIPLE MODEMS

BACKGROUND

Mobile computing devices, such as smart phones, may provide various processing capabilities. For example, mobile devices may provide various applications, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, remote e-mail access, text messaging, web browsing, and content (e.g., video and radio) reception. Exemplary wireless communications technologies include cellular, satellite, and mobile data networking technologies.

In order to employ multiple communications technologies, devices may include multiple modems. Thus, techniques for transferring information between modems and processes (such as user applications) are needed.

DETAILED DESCRIPTION

Embodiments may be generally directed to techniques for the exchange of information with modems. For instance, an apparatus may include a host device, multiple modems, and a serial connection to transfer information between the host device and the plurality of modems. The information may include data associated with one or more user applications and commands for the plurality of modems. The serial connection may be a Universal Serial Bus (USB) connection. Embodiments may provide various advantages. For instance, features (such as the employment of the serial connection) may provide for high data rates at reduced power consumption levels. Also, such features may provide reduced implementation costs, and complexity. Moreover, such features may allow for devices (e.g., the host and the plurality of modems) to exchange information while employing different clock rates.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements, as desired for a given implementation. It is worthy to note that any reference to "one embodiment" or "an embodiment" means that a particular feature, structure, or characteristic described in connection with the embodiment is included in at least one embodiment. The appearances of the phrases "in an embodiment" or "in one embodiment" in various places in the specification are not necessarily all referring to the same embodiment.

Figure 1:
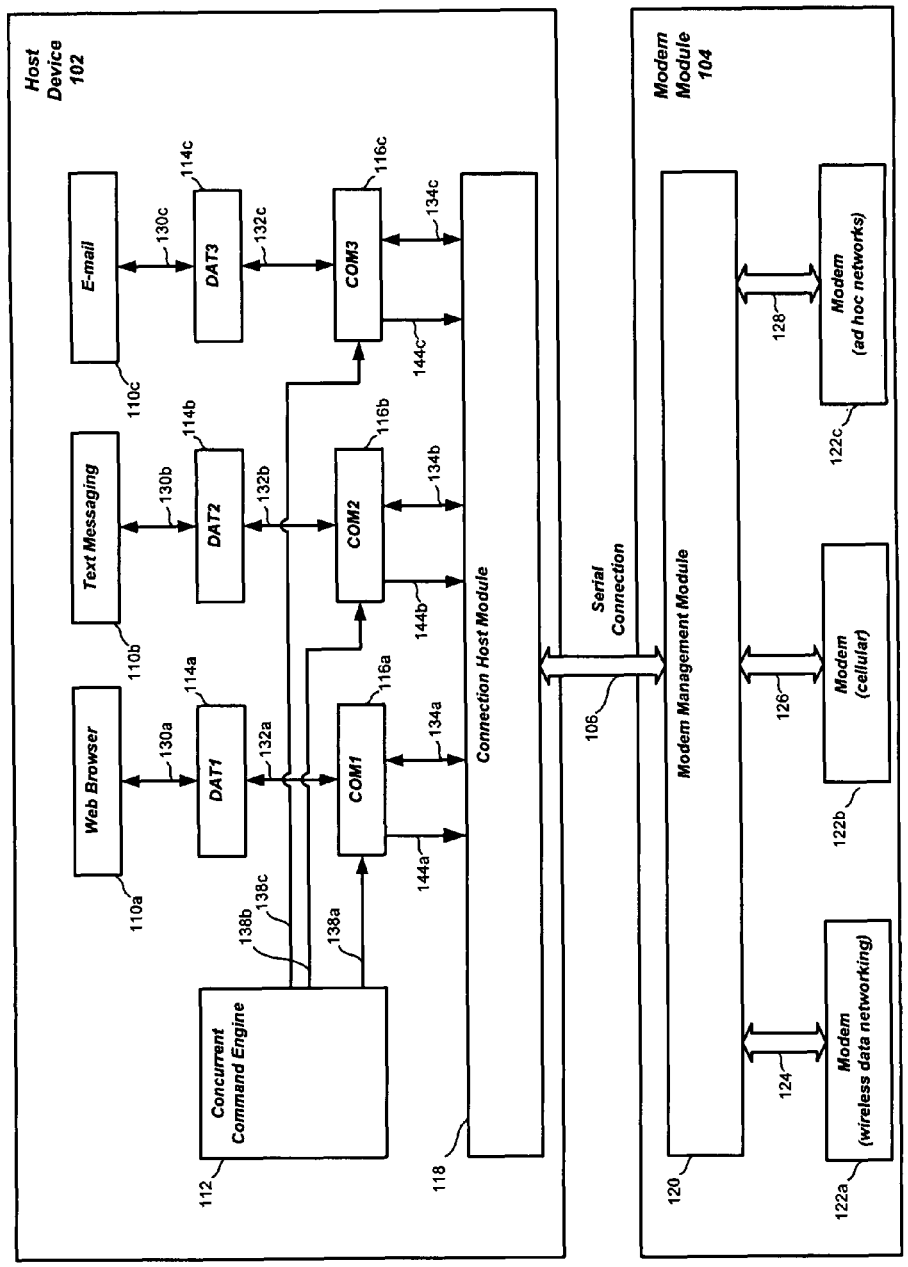
FIG. 1 illustrates an embodiment of an apparatus.

FIG. 1 illustrates one embodiment of an apparatus that may provide for the exchange of information with multiple modems. In particular, FIG. 1 shows an apparatus 100 comprising various elements. The embodiments, however, are not limited to these depicted elements. For instance, FIG. 1 shows that apparatus 100 may include a host device 102, a modem module 104, and a serial connection 106. These elements may be implemented in hardware, software, firmware, or in any combination thereof.

The elements of FIG. 1 may be implemented in a single user device, such as a wireless handset, personal digital assistant (PDA), smartphone, and so forth. The embodiments, however, are not limited to these examples. Moreover, host device 102 and modem module 104 may be implemented on one or more printed circuit boards (PCBs) or substrates. For example, in embodiments, host device 102 may be implemented on a first PCB and modem module 104 may be implemented on a second PCB. In further embodiments, host device 102 and modem module 104 may be implemented on a single PCB.

As shown in FIG. 1, host device 102 includes a multiple user applications 110*a-c*, a concurrent command engine 112, multiple data interfaces 114*a-c* (also shown as DAT1, DAT2, and DAT3), multiple communications (COM) ports 116*a-c* (also shown as COM1, COM2, and COM3), and a connection host module 118. Additionally, FIG. 1 shows modem module 104 including a modem management module 120 and multiple modems 122*a-c*.

User applications 110*a-c* may employ modems 122*a-c* to communicate with remote devices across one or more networks. Such networks may be wired or wireless. For purposes of illustration, FIG. 1 shows a web browser application 110*a*, a text messaging application 110*b*, and an e-mail application 110*c*. The embodiments, however, are not limited to these examples. Thus, other applications (such as telephony applications, various data communications applications, and so forth) may be employed.

As shown in FIG. 1, serial connection 106 is coupled between host device 102 and modem module 104. Thus, this connection may transfer information exchanged between applications 110*a-c* and modems 122*a-c*. Such information may include data produced by applications 110*a-c* for modulation by modems 122, as well as data demodulated by modems 122 for reception by applications 110*a-c*. Moreover, serial connection 106 may transfer commands from host device 102 (e.g., commands generated by concurrent command engine 112) to modems 122.

Serial connection 106 may comprise a pair of conductors to transfer the aforementioned information between host device 102 and modem module 104. In embodiments, serial connection 106 is implemented in accordance with Universal Serial Bus (USB) conventions (e.g., in accordance with USB version 2.0). However, embodiments may employ other USB versions (e.g., USB version 1.1, wireless USB, etc.), as well as other serial interface types.

In transferring signals across serial connection 106, embodiments may use signal levels other than the transceiver signal levels specified by the employed interface type. For example, USB specifies transceiver signal levels of 0.0-0.3 volts for a logical low level and 2.8-3.6 volts for a logical high level. However, embodiments may employ different (e.g., lower) voltage levels for signals.

For example, in embodiments where host device 102 and modem module 104 are on one or more PCBs or substrates within a user device, lower signals levels may be employed, as serial connection 106 may be relatively short. For instance, logical levels employed by other circuitry (e.g., by integrated circuit(s)) within host device 102 and/or modem module 104 may be employed Such implementations are referred to herein as being "transceiverless". An exemplary transceiverless signal level is 1.8 volts for a logical high level and a lower voltage for a logical low level. The embodiments, however, are not limited to such values.

Thus, this exchange of information across serial connection 106 may occur across multiple "pipes" or logical channels between connection host module 118 and modem management module 120. Such information exchanges may be asynchronous. Also, such information exchanges may occur when element(s) of host device 102 and element(s) of modem module 104 (e.g., modems 122a-c) employ different clock rates.

Moreover, connection host module 118 may be implemented with multiple (e.g., three) functional layers. As specified by USB standards, such layers may include (from low to high) a USB bus interface layer, a USB system layer, and a client layer. These layers may be implemented in hardware, software, firmware, or any combination thereof.

The USB bus interface layer handles electrical and protocol layer interactions across serial connection 106. The USB bus interface layer may include a host controller and a serial interface engine (SIE). The host controller manages data transfers between the host and USB devices. Further, the host controller provides an integrated root hub providing attachment points to serial connection 106. The SIE serializes data to be transmitted across connection 106. Also, the SIE deserializes data received from serial connection 106. Modem management module 120 may also include similar SIE features.

The USB system layer (in conjunction with the host controller of USB bus interface module), performs translation between the client layer's view of data transfers and the USB transactions across serial connection 106. The USB system layer also manages USB resources, such as bandwidth and bus power. The USB system layer may include a host controller driver (HCD), a USB driver (USBD), and host software.

Within connection host module 118, the client layer exchanges information with the USB system layer. Also, the client layer exchanges information with COM ports 118a-c.

In embodiments, the USB bus interface layer, the USB system layer, and the client layer may provide further or alternative features. Also, embodiments may employ approaches employing greater or fewer layers, as well as non-layered approaches.

Within modem module 104, modem management module 120 may provide multiple USB endpoints. Each of these endpoints is a uniquely addressable source or sink of information within modem management module 120. Accordingly, each of these endpoints corresponds to a pipe between connection host module 118 and modem management module 120.

Thus, modem management module 120 provides connection host module 118 with a collection of USB endpoints. These endpoints may be grouped into endpoint sets, where each endpoint set implements an interface. For instance, a first set of endpoints may provide an interface for modem 122a, a second set of endpoints may provide an interface for modem 122b, and a third set of endpoints may provide an interface for modem 122c.

Each endpoint set may include one or more endpoints, such as a first endpoint for data that is sent to the corresponding modem, a second endpoint for data that is received from the corresponding modem, and a third endpoint for commands that are sent to the corresponding modem.

In turn, from these endpoints, modem management module 120 may provide couplings to modems 122a-c that correspond to endpoint sets provided by modem management module 120. As shown in FIG. 1, these couplings include a first coupling 124 with modem 122a, a second coupling 126 with modem 122b, and a third coupling 128 with modem 122c. Thus, in embodiments, modem management module 120 and modems 122a-c may operate together as a USB device.

In situations where a limit in the number of available endpoints is reached, a USB shared notification endpoint mechanism may be employed. According to such a mechanism, each notification endpoint for each modem goes to a single dedicated common endpoint. Alternatively, out of band signaling techniques may be employed in such situations.

The endpoints provided by modem management module 120 may be enumerated or re-enumerated (e.g., after an endpoint reset event) according to USB techniques. Typically, USB transceiver signal levels are employed in re-enumeration. However, in embodiments that employ other signal levels (e.g., transceiverless implementations), alternate signal levels may be employed for enumeration and/or re-enumeration.

Various techniques may be employed to implement couplings 124, 126, and 128. For example, these couplings may be implemented as software or firmware interfaces. Alternatively, these couplings may be implemented as electronic signals or logic lines. The embodiments, however, are not limited to these examples.

Modems 122a-c provide for the exchange of information with remote devices across networks. Accordingly, modems 122a-c modulate information to produce signals for transmission across such networks. Modems 122a-c also demodulate signals received from such networks into information that is sent to applications 110a-c. As described above, modems 122a-c may be implemented with hardware, software, firmware, or any combination thereof.

In embodiments, each of modems 122a-c may operate with one or more types of networks. For example, FIG. 1 shows that modem 122a may operate with a wireless data network, modem 122b may operate with a cellular telephony network, and modem 122c may operate with an ad-hoc proximity network. Examples of such networks are provided below. Moreover, these network types are shown for purposes of illustration, and not limitation. For instance, modems 122a-c may operate with other network types (wired or wireless) in any combination.

In embodiments, modems 122a-c may exchange signals directly with certain networks (e.g., certain wired telephony networks). Alternatively, one or more of modems 122a-c may exchange signals with networks through front-end module(s) (not shown). Such modules may include components to prepare modulated signals for transmission and received signals for demodulation. Examples of such components include amplifiers, filters, antennas, diplexers, and so forth.

The exchange of information within host device 102 is now described. As shown in FIG. 1, host device 102 includes multiple data interfaces 114a-c and multiple communications (COM) ports 116a-c. These elements provide for the transfer of information between applications 110a-c and connection host module 118. For instance, data interfaces 114a-c exchange information with user applications 110a-c. In turn, data interfaces 114a-c exchange this information with COM ports 116a-c. Likewise, COM ports 116a-c exchange this information with connection host module 118. Also, COM ports 116a-c receive commands from concurrent command engine 112 and provide these commands to connection host module 118.

Each of data interfaces 114a-c and COM ports 116a-c may correspond to a particular modem within modem module 104. For instance, data interface 114a and COM port 116a may correspond to modem 122a, data interface 114b and COM port 116b may correspond to modem 122b, and data interface 114c and COM port 116c may correspond to modem 122c. However, the embodiments are not limited to such correspondences.

Data interfaces 114a-c may be implemented as software interfaces for applications 110a-c to send and receive application data. Accordingly, data interfaces 114a-c may include buffer storage (e.g., input and output queues) to provide for applications 110a-c with flexibility and convenience in sending and receiving data. Likewise, COM ports 116a-c operate as interfaces (virtual COM ports) between data interfaces 114a-c and connection host module 118, as well as interfaces between concurrent command engine 112 and connection host module 118.

FIG. 1 shows each of user applications 110a-c exchanging information with a particular data interface. In particular, FIG. 1 shows web browser application 110a exchanging information 130a with data interface 114a, text messaging application 110b exchanging information 130b with data interface 114b, and e-mail application 110c exchanging information 130c with data interface 114c.

In turn, data interfaces 114a-c exchange information with COM ports 116a-c. For instance, FIG. 1 shows data interface 114a exchanging information 132a with COM port 116a, data interface 114b exchanging information 132b with COM port 116b, and data interface 114c exchanging information 132c with COM port 116c.

In addition, COM ports 116a-c may receive modem commands from concurrent command engine 112. For instance, FIG. 1 shows concurrent command engine 112 sending a command 138a to COM port 116a, a command 138b to COM port 116b, and a command 138c to COM port 116c. These commands, which are also referred to as AT commands (AT stands for attention), direct modems 122a-c to perform certain operations. Examples of such operations include establishing or breaking a connection with a remote device.

Each of COM ports 116a-c exchanges information with connection host module 118. For instance, FIG. 1 shows connection host module 118 exchanging information 134a (corresponding to information 130a and information 132a) with COM port 116a, connection host module 118 exchanging information 134b (corresponding to information 130b and information 132b) with COM port 116b, and connection host module 118 exchanging information 134c (corresponding to information 130c and information 132c) with COM port 116c.

In addition, FIG. 1 shows COM port 116a sending a command 144a (which corresponds to command 138a) to connection host module 118, COM port 116b sending a command 144b (which corresponds to command 138b), and COM port 116c sending a command 144c (which corresponds to command 138c) to connection host module 118.

Thus, COM ports 116a-c exchange commands and information with connection host module 118. As described above, connection host module 118 transfers these commands and information across logical channels (or pipes) provided by serial connection 106.

Apparatus 100 may provide various advantages over implementations that employ more complicated connections, such as backplane bus architectures. For instance, features (such as the employment of the serial connection) may reduce power consumption, implementation cost, and complexity. Moreover, apparatus 100 may provide reductions in component space occupation. Also, apparatus 100 may simplify software development and troubleshooting. For instance, apparatus 100 may avoid the implementation of interfaces employing more complicated handshaking protocols.

The apparatus of FIG. 1 is shown for purposes of illustration, and not limitation. Thus, embodiments may include different features, elements, and/or arrangements of elements. For example, embodiments may include other numbers of modems, com ports, and/or data interfaces. Moreover, other correspondences and relationships between such elements may be employed.

Figure 2:
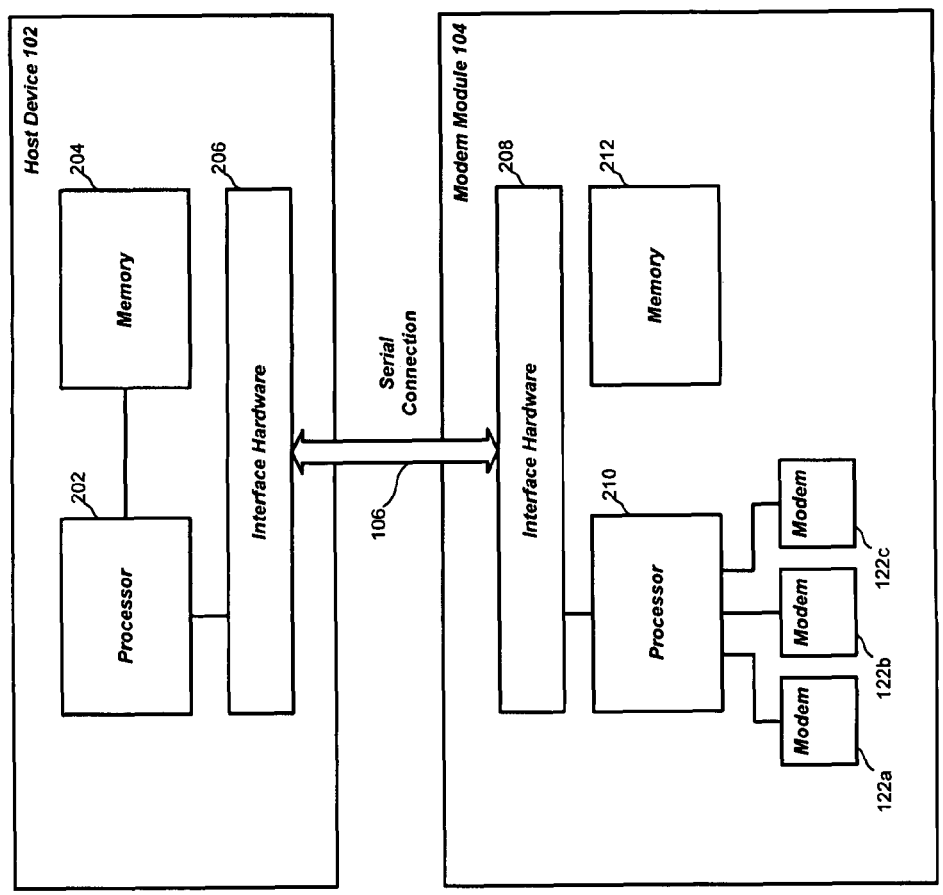
FIG. 2 illustrates an exemplary implementation embodiment.

FIG. 2 is a diagram showing an exemplary implementation 200 of apparatus 100. This implementation is shown for purposes of illustration and not limitation. Thus other implementations may be employed.

As shown in FIG. 2, host device 102 includes a processor 202, a memory 204, and interface hardware 206. Further, FIG. 2 shows modem module 104 includes interface hardware 208, a processor 210, memory 212, and modems 122a-c.

The implementation of FIG. 2 may involve multiple integrated circuits (ICs). For instance, this implementation may include a first IC comprising some or all of the elements of host device 102 and a second IC comprising some or all of the elements of modem module 104. The embodiments, however, are not limited to such. For instance, multiple ICs may comprise some or all of the elements of host device 102 and multiple ICs may comprise some or all of the elements of modem module 104.

Within host device 102, processor 202 may execute instructions (e.g., control logic, software) stored in memory 204. Accordingly, processor 202 may comprise one or more microprocessors and/or microcontrollers. The embodiments, however, are not limited to such processors. Memory 204 may comprise various types of storage media. Examples of such storage media are provided below. Also, in addition to storing instructions, memory 204 may store data, such as data to be handled by modems 122a-c.

Thus, processor 202 (in conjunction with memory 204) may implement user applications 110a-c, concurrent command engine 112, data interfaces 114a-c, and COM ports 116a-c. Also, processor 202 and memory 204 may implement features of connection host 118. Such features may include the client layer, the USB system layer, and portions of the USB bus interface layer. The embodiments, however, are not so limited.

Other features of connection host 118 (for example, portions of the USB bus interface layer) may be implemented by interface hardware 206. For instance, interface hardware 206 may provide a physical coupling to serial connection 106. In addition, interface hardware 206 may include components to provide for the exchange of signals across serial connection 106. Examples of such components include line driver circuitry, termination circuitry, serializer and deserializer circuitry, receiver circuitry, and so forth. As described above, serial connection 106 may use signal levels other than the levels specified by the employed interface type. Thus, in embodiments, interface hardware 206 may be implemented without conventional connection transceiver circuitry. As described above, such implementations are referred to herein as being "transceiverless".

Within modem module 104, processor 210 may execute instructions (e.g., control logic, software) stored in memory 212. Accordingly, processor 210 may comprise one or more microprocessors and/or microcontrollers. The embodiments, however, are not limited to such processors. Memory 212 may comprise various types of storage media. Storage media examples are provided below. Also, in addition to storing instructions, memory 212 may store data, such as data to be handled by modems 122a-c.

Thus, processor 210 (in conjunction with memory 212) may implement features of modem management module 120. Also, in embodiments, processor 210 and memory 212 may implements features of one or more of modems 122a-c. However, in further embodiments, modem module 104 may include multiple processors. Each of these multiple processors may implement features of one or more of modems 122a-c.

Like interface hardware 206, interface hardware 208 may provide a physical coupling to serial connection 106. In addition, interface hardware 208 may include components to provide for the exchange of signals across serial connection 106. Examples of such components include line driver circuitry, termination circuitry, serializer and deserializer circuitry, receiver circuitry, and so forth. Thus, interface hardware 208 may provide features of modem management module 120. As described above, serial connection 106 may use signal levels other than the levels specified by the employed interface type. Thus, in embodiments, interface hardware 206 may be implemented as without conventional connection transceiver circuitry (transceiverless implementations).

Operations for embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 3:
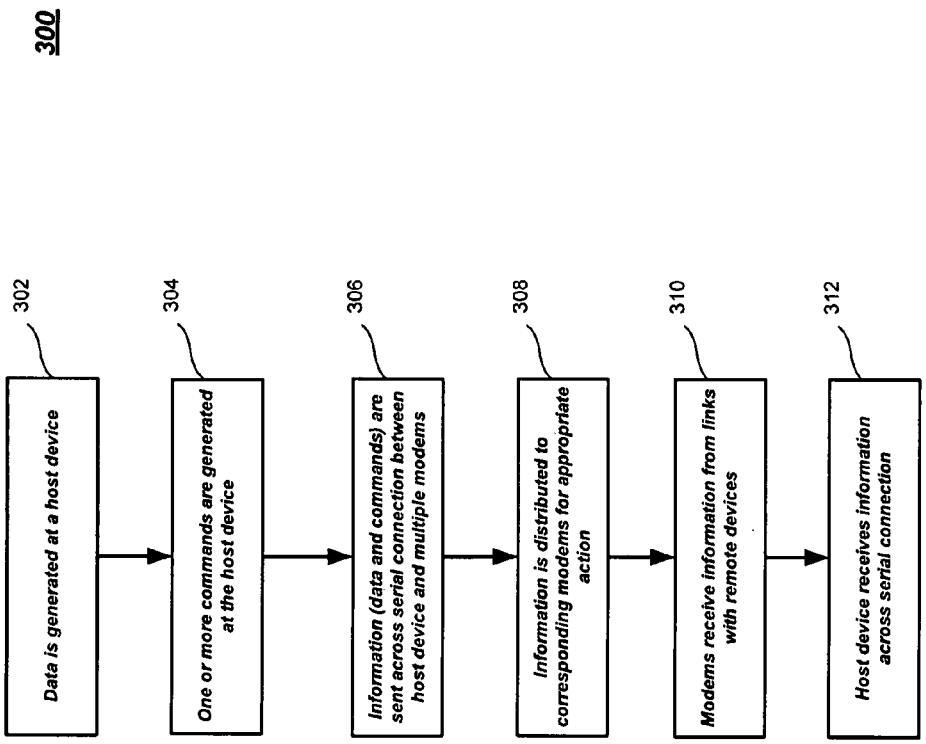
FIG. 3 is an exemplary flow diagram.

FIG. 3 illustrates one embodiment of a logic flow. In particular, FIG. 3 illustrates a logic flow 300, which may be representative of the operations executed by one or more embodiments described herein. As shown in FIG. 3, logic flow 300 includes a block 302, at which data is generated at a host device (e.g., at host device 102). This generated data may be associated with various applications, such as applications 110a-c. For example, the generated data may include first data associated with a first application and second data associated with a second application.

Moreover, this data may be for transmission across different network types. Thus the generated data may be for modulation by different modems (e.g., modems 122a-c). As an example, the first data may be for modulation by a first modem, and the second data may be for modulation by a second modem.

At a block 304, modem commands are generated at the host device. These commands may include a first command for the first modem and a second command for the second modem. In the context of FIG. 1, these commands may be generated by concurrent command engine 112. Each these commands may be for the corresponding modems to establish connections or links with modems at remote devices. The embodiments, however, are not limited to such commands.

The flow of FIG. 3 further includes a block 306, at which information is sent across a serial connection between the host device and the multiple modems. With reference to FIG. 1, this serial connection may be connection 106. This information may include the data generated at block 302 (the first data and the second data) and the commands generated at block 304 (the first command and the second command).

As indicated by a block 308, the information sent at block 306 is distributed to their corresponding modems for appropriate action (e.g., link establishment and modulation). In the context of FIG. 1, this distribution may be performed by modem management module 120.

At a block 310, the modems may receive information from links with remote devices. This information may include data for reception by the applications. For example, this information may include third data for the first application, and fourth data for the second application. Accordingly, the third data may be received by the first modem and the fourth data may be received by the second modem. With reference to FIG. 1, modem management module 120 may receive this information and forward it across serial connection 106.

FIG. 3 further shows a block 312, at which the host device may receive information across the serial connection. This information may be the data received at block 310.

Figure 4:
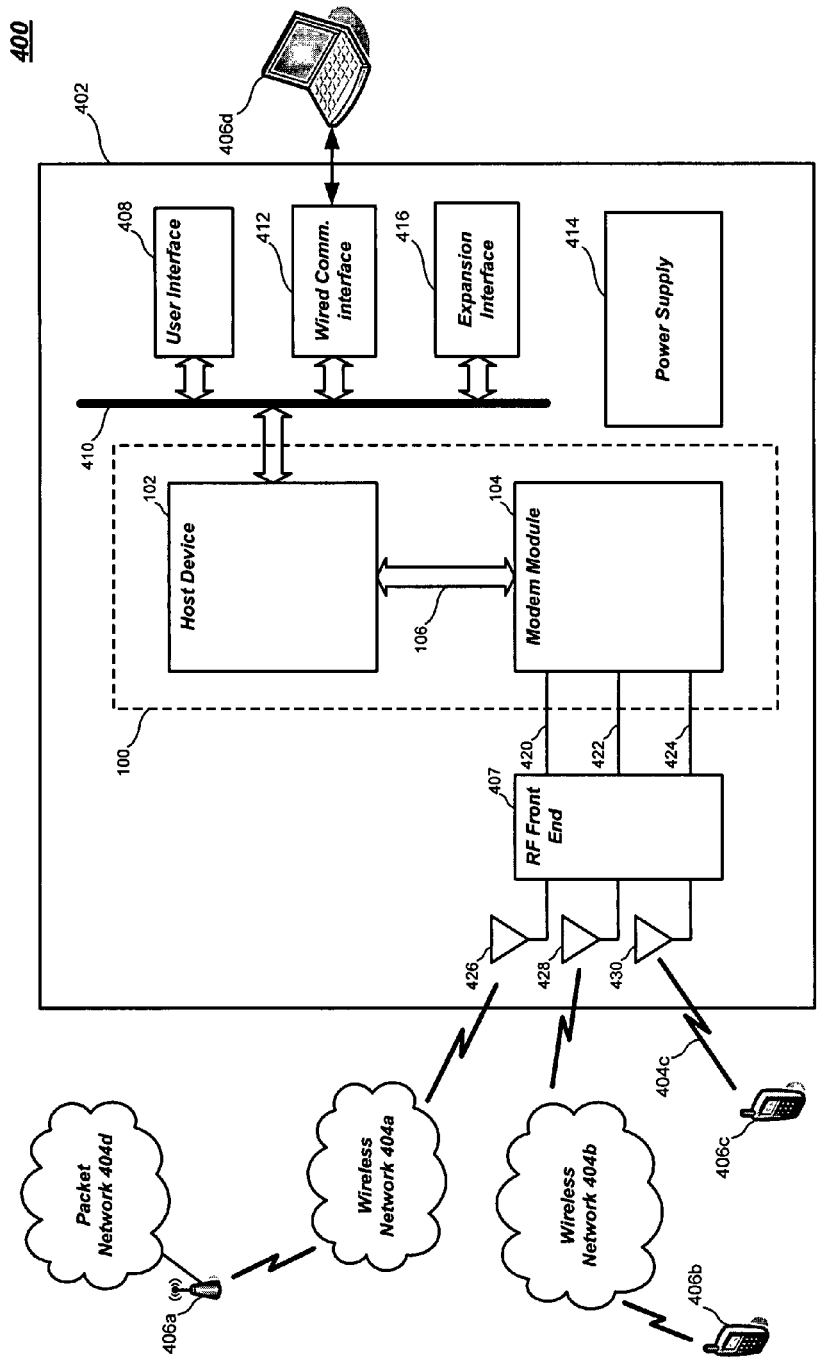
FIG. 4 illustrates an embodiment of a system.

FIG. 4 illustrates an embodiment of a system 400. This system may be suitable for use with one or more embodiments described herein, such as apparatus 100, implementation 200, logic flow 300, and so forth. Accordingly, system 400 may engage in wireless communications across various link types, such as the ones described herein. In addition, system 400 may perform various applications.

As shown in FIG. 4, system 400 may include a device 402, such as a mobile telephone, smartphone, personal digital assistant (PDA), notebook computer, and so forth. Further, system 400 includes multiple communications networks 404, as well as one or more remote devices 406.

FIG. 4 shows that device 402 may include the elements of FIG. 1. Also, device 402 may include a radio frequency (RF) front end 407, a user interface 408, interconnection medium 410, a wired communications interface 412, a power supply (e.g., a battery) 414, and an expansion interface 416. These further elements are shown as being separate. However, in embodiments, one or more of these elements may be included in host device 102 and/or modem module 104. Moreover, these further elements may be implemented in hardware, software, firmware, or any combination thereof.

As shown in FIG. 4, RF front end 407 is coupled to modem module 104. RF front end 407 may include components (e.g., amplifiers, filters, antennas, diplexers, and so forth) to prepare modulated signals for transmission and to prepare received signals for demodulation.

FIG. 4 shows multiple connections (420, 422, and 424) between modem module 104 and RF front end 407. Each of these connections may be to a particular modem within modem module 104. For instance, connection 422a may be to modem 122a, connection 422b may be to modem 122b, and connection 422c may be to modem 122c. Further, FIG. 4 shows multiple antennas (426, 428, and 430) that may exchange wireless signals with remote devices. These antennas may correspond to a particular connection between RF front end 407 and modem module 104. For instance, antenna 426 may correspond to connection 420, antenna 428 may correspond to connection 422, and antenna 430 may correspond to connection 424. The embodiments, however, are not limited to these arrangements of connections and antennas.

FIG. 4 shows that device 402 may communicate across wireless networks 404a-c. Wireless network 404a may be a wireless data network, while wireless network 404b may be a cellular network. Further, wireless network 404c may be an ad-hoc proximity network. The embodiments, however, are not limited to these examples.

Such networks allow device 402 to communicate with various remote devices. For instance, FIG. 4 shows wireless network 404b providing wireless communications (e.g., WLAN and/or WMAN communications) with an access point 406a. In turn, access point 406a may provide device 402 with access to further communications resources. For example, FIG. 4 shows access point 406a providing access to a packet network 404d, such as the Internet.

In addition, FIG. 4 shows wireless network 404b providing wireless communications (e.g., cellular telephony or messaging) with a mobile device 406b. Further, FIG. 4 shows device 402 communicating across wireless network 404c (e.g., a Bluetooth link) with a device 406c.

User interface 408 facilitates user interaction with apparatus 100. This interaction may involve the input of information from a user and/or the output of information to a user. Accordingly, user interface 104 may include one or more devices, such as a keyboard (e.g., a full QWERTY keyboard), a keypad, a touch screen, a microphone, and/or an audio speaker. The embodiments are not limited to these examples.

Interconnection medium 410 provides for couplings among elements, such as host device 102, user interface 408, wired communications interface 412, and/or expansion interface 416. Thus, interconnection medium 410 may include, for example, one or more bus interfaces. Exemplary interfaces include Universal Serial Bus (USB) interfaces, as well as various computer system bus interfaces. Additionally or alternatively, interconnection medium 410 may include one or more point-to-point connections (e.g., parallel interfaces, serial interfaces, etc.) between various element pairings. Such connections may comprise one or more signal lines. Moreover, interconnection medium 410 may include non-physical aspects. For instance, such interconnectivity may be implemented through messages passed between processes or software modules.

Wired communications interface 412 provides for the exchange of information with a device 406d (e.g., a proximate device), such as a personal computer. This exchange of information may be across one or more wired connections. Examples of such connections include USB interfaces, parallel interfaces, and/or serial interfaces. In addition, interface 412 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 412 may include various components, such as a transceiver and control logic to perform operations according to one or more communications protocols. In addition, communications interface 412 may include input/output (I/O) adapters, physical connectors to connect the I/O adapter with a corresponding communications medium.

Expansion interface 416 may be in the form of an expansion slot, such as a secure digital (SD) slot. Accordingly, expansion interface 416 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Power supply 414 provides operational power to elements of device 402. Accordingly, power supply 414 may include a battery. Such a battery may be rechargeable and/or removable. Alternatively or additionally, power supply 414 may include an interface to an external power source, such as an alternating current (AC) source. However, the embodiments are not limited to these examples.

As described above, embodiments may communicate across various types of wireless links, such as data networking links, personal area networking (PAN) links, and/or links provided by cellular systems.

Examples of data networking links include wireless local area network (WLAN) links, such as IEEE 802.11 WiFi links. Further examples include wireless metropolitan area (WMAN) links, such as IEEE 802.16 WIMAX links. Examples of PAN links include ad-hoc proximity network links, such as Bluetooth links. The embodiments, however, are not limited to these examples.

Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples. For instance, radio module 108 may additionally or alternatively communicate across non-cellular communications links.

Further, embodiments may include storage media, such as memory 204 and memory 212. Such storage media may be implemented in various ways. For example, such storage media may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 204 and/or memory 212 may be included in other elements of embodiments. For instance, some or all of memory 204 may be included on a same integrated circuit or chip with elements of host device 102 (e.g., processor 202). Similarly, some or all of memory 212 may be included on a same integrated circuit or chip with elements of modem module 104 (e.g., processor 210).

Alternatively, some portion or all of such storage media may be disposed on an integrated circuit or other medium (e.g., a hard disk drive) that is external to such elements. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a host device configured to operate a plurality of user applications, the host device including a connection host module;
   a modem module having a plurality of modems; and
   a serial connection to transfer information between the connection host module and the plurality of modems, the information comprising data associated with the plurality of user applications and commands for the plurality of modems;
   wherein the host device includes a plurality of communications ports and a plurality of data interfaces, each of the plurality of communications ports and each of the plurality of data interfaces corresponding to a particular one of the plurality of modems;
   wherein the serial connection comprises a plurality of logical channels and employs signal levels for a logical low level and a logical high level, wherein the logical high level is less than transceiver signal levels specified by a standard under which the serial connection would otherwise operate under.

2. The apparatus of claim 1, further comprising a modem management module coupled to the serial connection, the modem management module to provide a plurality of endpoint sets, each endpoint set corresponding to one of the plurality of modems, and each endpoint set comprising one or more endpoints.

3. The apparatus of claim 2, wherein each of the plurality of endpoint sets comprises:
   a first endpoint for receiving data for modulation;
   a second endpoint for providing demodulated data; and
   a third endpoint for receiving commands.

4. The apparatus of claim 1, wherein the host device includes a command engine to generate the commands for the plurality of modems.

5. The apparatus of claim 4, the plurality of communications ports to receive the commands from the command engine and to exchange the data with the plurality of data interfaces.

6. The apparatus of claim 5, wherein the connection host module is coupled between the plurality of communications ports and the serial connection.

7. The apparatus of claim 1, wherein the serial connection is a Universal Serial Bus (USB) connection.

8. The apparatus of claim 7, wherein the USB connection is a USB 2.0 connection.

9. The apparatus of claim 1, wherein the host device and the modem module are included in a user device.

10. The apparatus of claim 1, wherein the host device includes one or more integrated circuits and the serial connection transmits signals at levels employed by the one or more integrated circuits.

11. The apparatus of claim 1, wherein the modem module is included in one or more integrated circuits and the serial connection transmits signals at levels employed by the one or more integrated circuits.

12. The apparatus of claim 1, wherein the host device and the plurality of modems operate at different clock rates.

13. The apparatus of claim 1, wherein the serial connection is to transfer information between the host device and the plurality of modems asynchronously.

14. The apparatus of claim 1, the connection host module including multiple functional layers including an interface layer, a system layer, and a client layer, the interface layer for electrical and protocol layer interactions across the serial connection, the system layer to perform translation between the client layer and transactions across the serial connection, the client layer to exchange information with the system layer and plurality of communications ports.

15. The apparatus of claim 14, the connection host module to receive commands from a concurrent command engine via the plurality of communications ports.

16. A method for operating a computing device comprising:

generating, at a host device, first data associated with a first application and second data associated with a second application, the first data for modulation by a first modem, and the second data for modulation by a second modem;

generating, at the host device, a first command for the first modem and a second command for the second modem; and sending the first data, the second data, the first command, and the second command across a serial connection, wherein the serial connection is between a connection host module of the host device and a modem module comprising the first and second modems, the host device including a first and second communications ports and a first and second data interfaces, the first and second communications ports and the first and second data interfaces corresponding to respective first and second modems;

wherein the serial connection comprises a plurality of logical channels and employs signal levels for a logical low level and a logical high level, wherein the logical high level is less than transceiver signal levels specified by a standard under which the serial connection would otherwise operate under.

17. The method of claim 16, wherein the serial connection is a Universal Serial Bus (USB) connection.

18. The method of claim 17, wherein the USB connection is a USB 2.0 connection.

19. The method of claim 16, further comprising:

receiving, at the host device, third data across the serial connection, the third data and from the first modem and associated with the first application; and receiving, at the host device, fourth data across the serial connection, the fourth data and from the first modem and associated with the first application.

20. The method of claim 16, the connection host module including multiple functional layers including an interface layer, a system layer, and a client layer, the interface layer for electrical and protocol layer interactions across the serial connection, the system layer to perform translation between the client layer and transactions across the serial connection, the client layer to exchange information with the system layer and plurality of communications ports.

* * * * *